US005788117A

United States Patent [19]

Zimmanck

[11] Patent Number: 5,788,117

[45] Date of Patent: Aug. 4, 1998

[54] BEVERAGE CAN DISPENSER

[76] Inventor: Jack Zimmanck, 1112 Applebriar, Marlborough, Mass. 01752

[21] Appl. No.: 682,264

[22] Filed: Jul. 17, 1996

[51] Int. Cl.$^{6}$ .......... B65G 59/00

[52] U.S. Cl. .......... 221/285; 221/287; 221/281; 221/312 R; 211/59.2; 312/45

[58] Field of Search .......... 221/281, 285, 221/286, 287, 303, 312 R; 211/59.2; 312/45, 72, 73

[56] References Cited

U.S. PATENT DOCUMENTS

| | | | |
|---|---|---|---|
| 1,753,957 | 4/1930 | Wasburn | 221/287 |
| 3,416,719 | 12/1968 | Pilger | 229/20 |
| 3,923,159 | 12/1975 | Taylor et al. | 221/59.2 |
| 4,729,480 | 3/1988 | Groover et al. | 312/72 |
| 4,899,929 | 2/1990 | Grollman | 229/122.1 |
| 5,228,590 | 7/1993 | Blasko et al. | 220/501 |
| 5,249,681 | 10/1993 | Miller | 206/427 |
| 5,390,821 | 2/1995 | Markel | 221/194 |

FOREIGN PATENT DOCUMENTS

| | | | |
|---|---|---|---|
| 403198192A | 8/1991 | Japan | 221/281 |
| 404115392A | 4/1992 | Japan | 221/281 |

*Primary Examiner*—William E. Terrell
*Assistant Examiner*—Khoi H. Tran
*Attorney, Agent, or Firm*—Brian M. Dingman

[57] ABSTRACT

A dispenser for dispensing cylindrical objects of uniform diameter, such as beverage cans, from a package holding at least two rows of the objects, with at least two objects in each row. The dispenser has a front face that defines an object-dispensing opening at its lower end. The opening is shaped to allow an object being dispensed to pass through the opening. There is a dispensing tray at the bottom of the opening and projecting outward from the front face of the dispenser. The dispensing tray is adapted to receive and hold an object dispensed from the package and through the opening. The dispenser also includes an object-repositioning structure inward of the front face and positioned to contact the front object in the second row of objects at or above its center line when the dispenser is placed over an opened end of the package. The object-repositioning structure thus inhibits the front object in the second row of objects from moving directly forward, and guides it downward, to cause it to freely dispense from the package through the object-dispensing opening. The dispenser provides for the free and easy dispensing of all of the objects from the package.

18 Claims, 7 Drawing Sheets

BEVERAGE CAN DISPENSER

FIELD OF THE INVENTION

This invention relates to a dispenser for dispensing cylindrical objects that are held in a package; more particularly, beverage cans.

BACKGROUND OF THE INVENTION

Soft drink and beer cans are very commonly sold in twelve, eighteen and thirty-can paper-board packages. The cans are in a matrix-like configuration in the package, commonly with at least three rows of cans. Twelve-packs contain three rows of four cans each.

The packages are usually designed with a perforated tear out section at one corner that allows the cans to be dispensed from the package. However, it is difficult to easily dispense the cans through this opening, as they tend to jam and block the opening. Usually the second and third cans are particularly difficult to remove from such packages-often times it is necessary to reach into the package to dislodge the jammed cans. Also, the opening tends to tear and enlarge, causing the cans to roll out of the package uncontrollably. An additional problem with the package is that there is nothing to prevent the cans from rolling out of the package once they are free from the opening. Thus, when the jam is resolved, the cans tend to roll, one after another, out of the package.

There have been developed dispensing devices that are adapted to work with such beverage can packages. One such dispenser is disclosed in Markel, U.S. Pat. No. 5,390,821. The Markel dispenser comprises a vertical front face with a lower opening and a projecting dispensing tray. The dispenser is designed to fit over an opened end of the beverage can package. Although the tray does prevent the cans from freely rolling out of the package, the dispenser does not solve the jamming problem, which is caused primarily by the weight of the upper cans on the two or three cans closest to the dispensing opening, in conjunction with the vertical front face that sits directly up against the front can in the second row of cans. Also, the bottom of the Markel dispenser is flat, so the cans do not naturally roll into the dispensing tray. Thus, the Markel dispenser does not solve the problems associated with can dispensing.

In addition, the Markel dispenser is designed to engage with the two side flaps of the beverage can package to hold the dispenser against the end of the package. Thus, if the end flaps of the package are wet or are torn when the end of the package is opened, the Markel dispenser may not function properly. In addition, the dispenser is difficult to remove from an empty package due to the engagement of the end flaps in the dispenser.

SUMMARY OF THE INVENTION

It is therefore an object of this invention to provide a dispenser for cylindrical objects that is effective for dispensing all of the objects from a package, and is easy to use.

It is a further object of this invention to provide such a dispenser that is particularly adapted for accomplishing the dispensing of soda and beer cans from packages of twelve or more cans, without first removing them individually from the package.

It is a further object of this invention to provide such a dispenser that prevents the objects from jamming across the dispenser opening.

This invention features a dispenser for dispensing cylindrical objects, such as soft drink and beer cans, from a package holding at least two rows of the objects, with at least two objects in each row. The preferred embodiment shown and described below is depicted for use with twelve-can packages, although that is not a limitation of the invention. The dispenser has a front face which defines an object-dispensing opening at its lower end. The opening is adapted to allow an object to pass therethrough to dispense an object from the package. The dispenser also preferably has a dispensing tray at the bottom of the opening, and projecting outward of the front face, to receive and hold an object dispensed from the package through the opening. This opening and dispensing tray allows only one object at a time to be grasped and withdrawn from the dispensing tray, while preventing any other objects from rolling out of the dispenser, as commonly happens with packages without the dispenser of this invention.

The dispenser also includes an object-repositioning structure inward of the front face, and positioned to contact the front object in the second row of objects at or above its center line when the dispenser is placed over an opened end of the package. This object-repositioning structure inhibits that front object from moving directly forward, and guides it downward, to cause it to freely dispense from the package through the object-dispensing opening.

In a preferred embodiment, the object-repositioning structure includes a downwardly-sloped surface depending from the inside of the front face, and an upwardly-sloped surface depending from the front face and meeting the downwardly-sloped surface to form an object-contacting vertex. In the preferred embodiment, the downwardly-sloped surface forms an angle with the horizontal of approximately 40°, and the upwardly-sloped surface forms an angle with the horizontal of approximately 20°. The two surfaces preferably meet at an acute angle, which in the preferred embodiment is approximately 60°.

The front face may be essentially vertical. The dispenser may include a package holding means for holding a package in relation to the front face. The dispenser may also include a bottom portion connected to the dispensing tray and adapted to support the package thereon. The package holding means may then be accomplished with one or more tab portions extending up from the bottom portion. These tab portions are preferably spaced from the object-repositioning structure a distance approximately the same as the length of the package so that the opened end of the package is held in place proximate the object-repositioning structure. The bottom portion may be sloped down towards the dispensing tray, preferably at approximately a 10° angle, to urge the objects toward the opening. The dispenser may also include a top portion defining an inside top to the dispenser that preferably approximately parallels the bottom portion.

The object-repositioning structure in the preferred embodiment is an elongated, wedge-shaped structure that projects inward from the front face of the dispenser. The object-repositioning structure can be accomplished in other manners, however. For example, the inside front face of the dispenser can be sloped inward from the object-dispensing opening upward, or a block or blocks can be placed on the inside of the front face.

BRIEF DESCRIPTION OF THE DRAWINGS

Other objects, features and advantages will occur to those skilled in the art from the following description of the preferred embodiment and the accompanying drawings, in which.

DESCRIPTION OF THE PREFERRED EMBODIMENT

Figure 1:
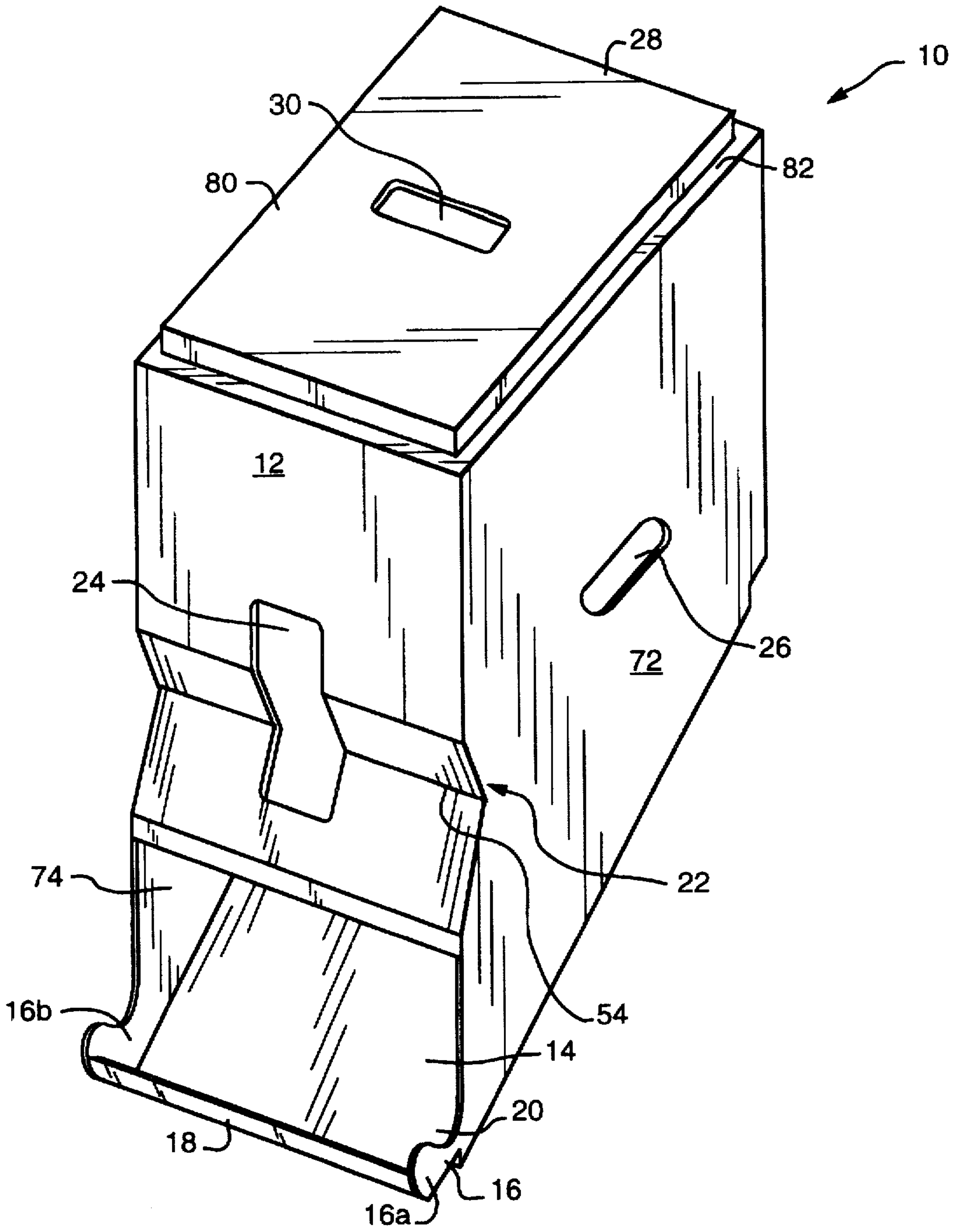
FIGS. 1 and 2 are front and rear three-dimensional views, respectively, of a preferred embodiment of the object dispenser of this invention.
Figure 2:
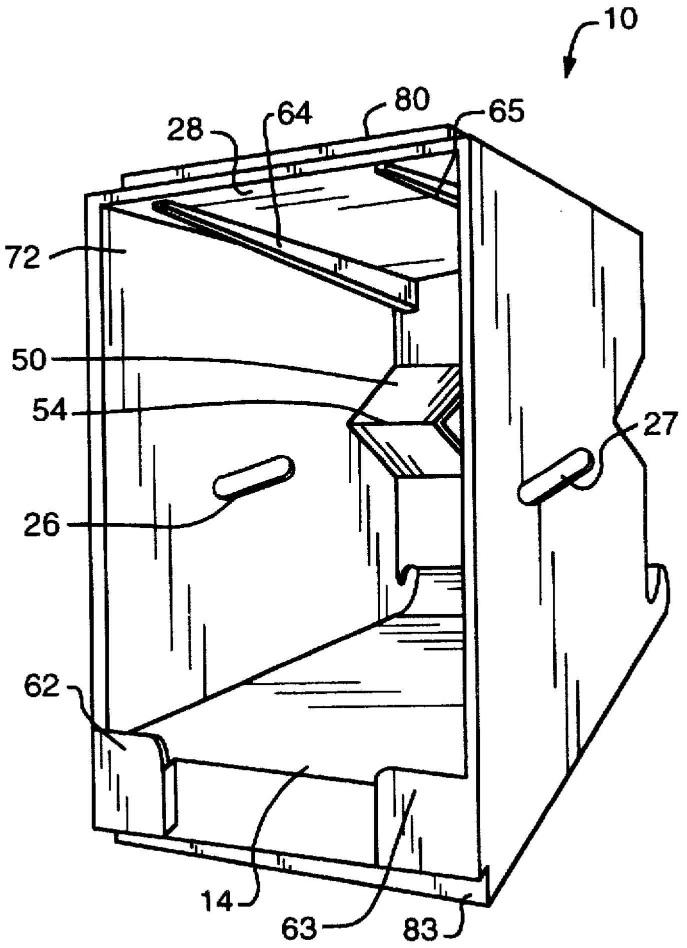
Figure 3:
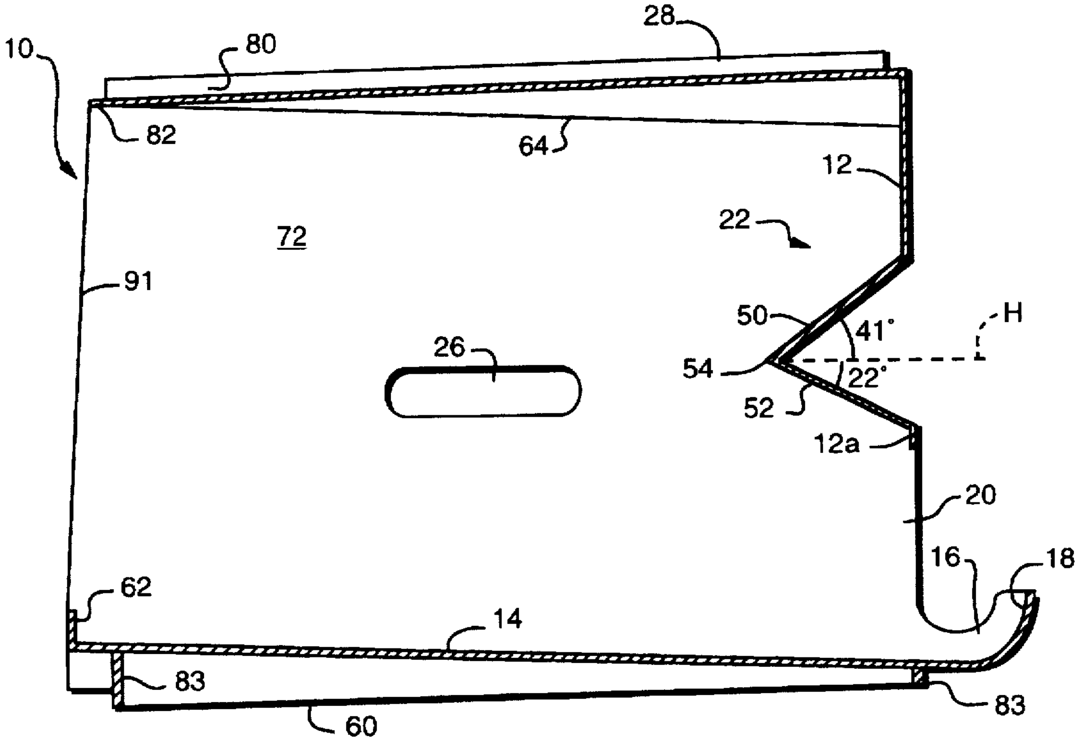
FIGS. 3 through 5 are longitudinal cross-sectional, front and top views, respectively, of the dispenser of FIGS. 1 and 2.
Figure 4:
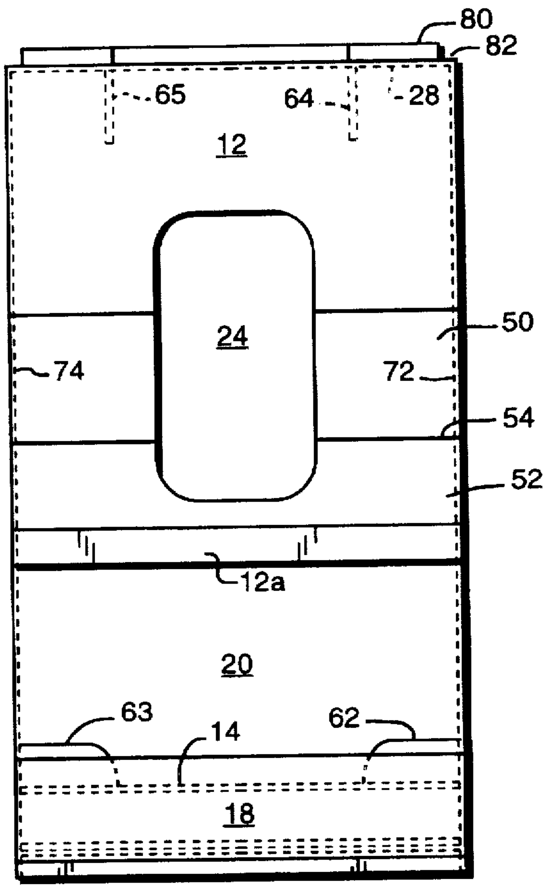
Figure 5:
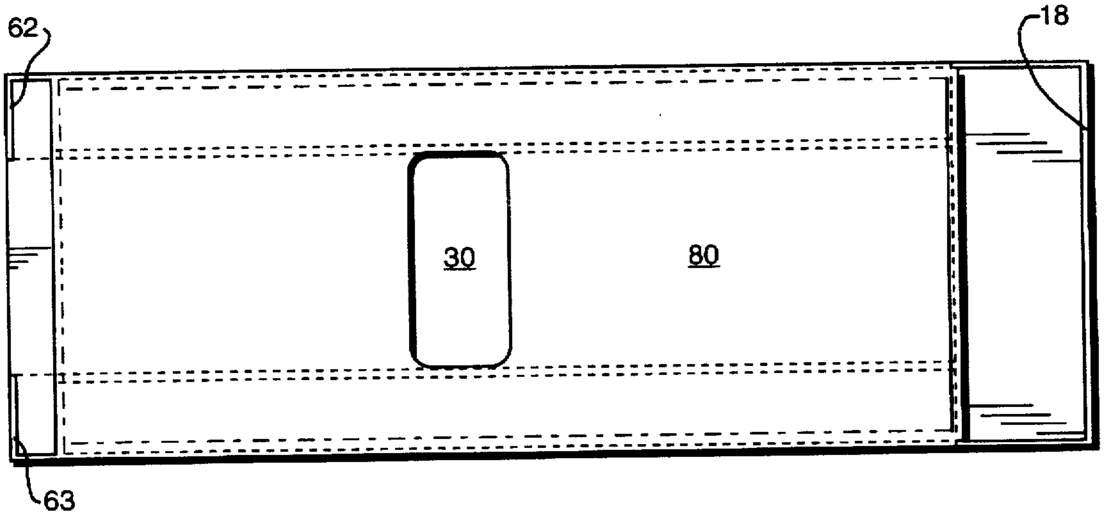

This invention is preferably accomplished as a dispenser for freely and easily dispensing generally cylindrical beverage cans from a 12-can package holding three rows of four cans each—the standard 12-pack paper-board beverage can package ubiquitous in the soft drink and beer markets, without first removing the cans from the 12-pack containers. Such packages have ends that are closed by four flaps that can be opened to allow access to the cans. The preferred embodiment of the dispenser of this invention is adapted to be placed over an open end of such a 12-pack, and then tipped down onto a horizontal surface. The dispenser has been carefully designed to allow the dispensing of all 12 cans from the package, without the jamming of the cans that prevents their easy dispensing as occurs with other can dispensers.

The preferred embodiment of the dispenser of this invention is shown in FIGS. 1 through 6. FIGS. 1 through 5 detail the construction of the preferred embodiment, and FIGS. 6A and 6B are schematic representations of the manner in which the dispenser guides the movement of the cans as they are dispensed from a 12-pack over which the dispenser has been placed.

Dispenser 10 includes vertical front face 12 which defines object (can)-dispensing opening 20 at its lower end. Opening 20 is adapted to allow a standard 12 or 16 ounce beverage can to pass therethrough so that the can can be removed from dispenser 10, and thus dispensed from the 12-pack package that is placed inside of dispenser 10, without first removing the can from the carton.

Dispensing tray 16 is located at the bottom of opening 20 and projects outward from front face 12 to receive and hold a can that has been dispensed from the package through opening 20. Tray 16 is defined by sides 16a and 16b and curved bottom and front section 18 that defines a can stop.

Dispenser 10 also includes an object (can)-repositioning structure 22 that is located inward of front face 12 and positioned to contact the front can in the second row of cans or above its center line when dispenser 10 is placed over an open end of the package. Structure 22 inhibits this front can in the second row of cans from moving directly forward, and guides it downward, to cause it to freely dispense from the dispenser through opening 20.

The can-repositioning structure is accomplished in the preferred embodiment by a wedge-shaped protrusion comprised of downwardly-sloped surface 50 depending from the inside of front face 12, and upwardly-sloped surface 52 depending from lower portion 12a of front face 12. Surfaces 50 and 52 meet at object-contacting vertex 54.

It has been found experimentally that surface 50 is preferably angled at approximately 40° (more specifically 41°) from horizontal H, while surface 52 is angled at approximately 20° (more specifically 22°) from the horizontal. The wedge formed by surfaces 50 and 52 thus defines an angle of approximately 60° (more specifically 63°), which is an acute angle. The function of this wedge, and of vertex 54, will be explained in more detail in relation to FIGS. 6A and 6B.

To assist in urging the cans to roll toward opening 20, bottom portion 14 is preferably sloped down toward dispensing tray 16 at an angle of approximately 10° from the horizontal. In order to more securely hold a package within the interior of dispenser 10, top 28 preferably has projecting downward therefrom triangular fins 64 and 65 that define an inside top to dispenser 10 that approximately parallels bottom portion 14. This inside top may also be formed in other manners, for example, with a wedge shaped top to the dispenser. Alternatively, fins having the appropriate slope can be formed projecting inward from the sides of the container.

To keep the package within the interior of dispenser 10, the dispenser preferably includes a package holding means for holding the package in relation to the front face 12. This is accomplished in the preferred embodiment with tab portions 62 and 63 that extend up from the back end of bottom portion 14. Dispenser 10 is designed so that the distance along bottom portion 14 from tabs 62 and 63 to vertex 54 is just slightly longer than the beverage can package, so that the package is held snuggly within dispenser 10, and also to allow vertex 54 to reposition the cans as described below.

Dispenser 10 is designed so that a number of identical dispensers can be stacked one upon another. Raised top 28 defines a perimeter rectangular top support surface 82. Lower rectangular projection 83, on which container 10 rests, can fit over top 28 of a second container to rest on top support surface 82 of the second container, to allow the containers to be stacked.

To facilitate ease of lifting and placing dispenser 10 into a refrigerator, openings 26 and 27 are made centrally in sides 73 and 74, respectively. There is a similar opening 30 in top 28 that is also centrally placed. These three openings can be used as handles that allow container 10 to be easily carried and moved, regardless of whether it is full or partially empty. The central positioning of openings 26, 27 and 30 causes dispenser 10 to be well balanced when lifted by means of these openings.

Opening 24 in front face 12 and surfaces 50 and 52 is provided to allow the user to see into the interior of dispenser 10 to count the remaining cans. Opening 24 would obviously not be necessary if dispenser 10 was made from a transparent material.

Figure 6A:
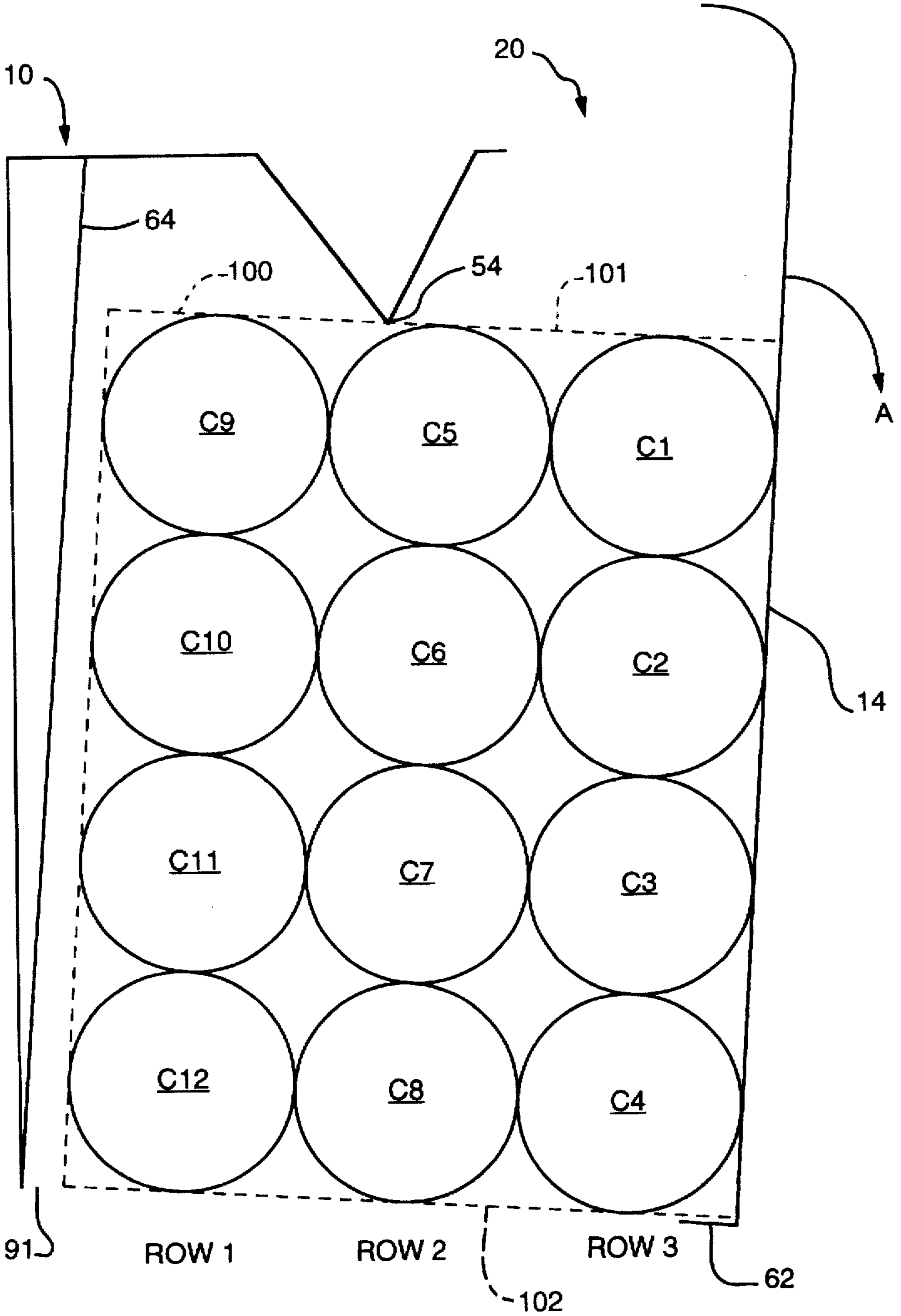
FIG. 6A is a schematic diagram of the dispenser of FIGS. 1 through 5 placed over the opened end of a 12-pack beverage can package, before the dispenser is ready for use.
Figure 6B:
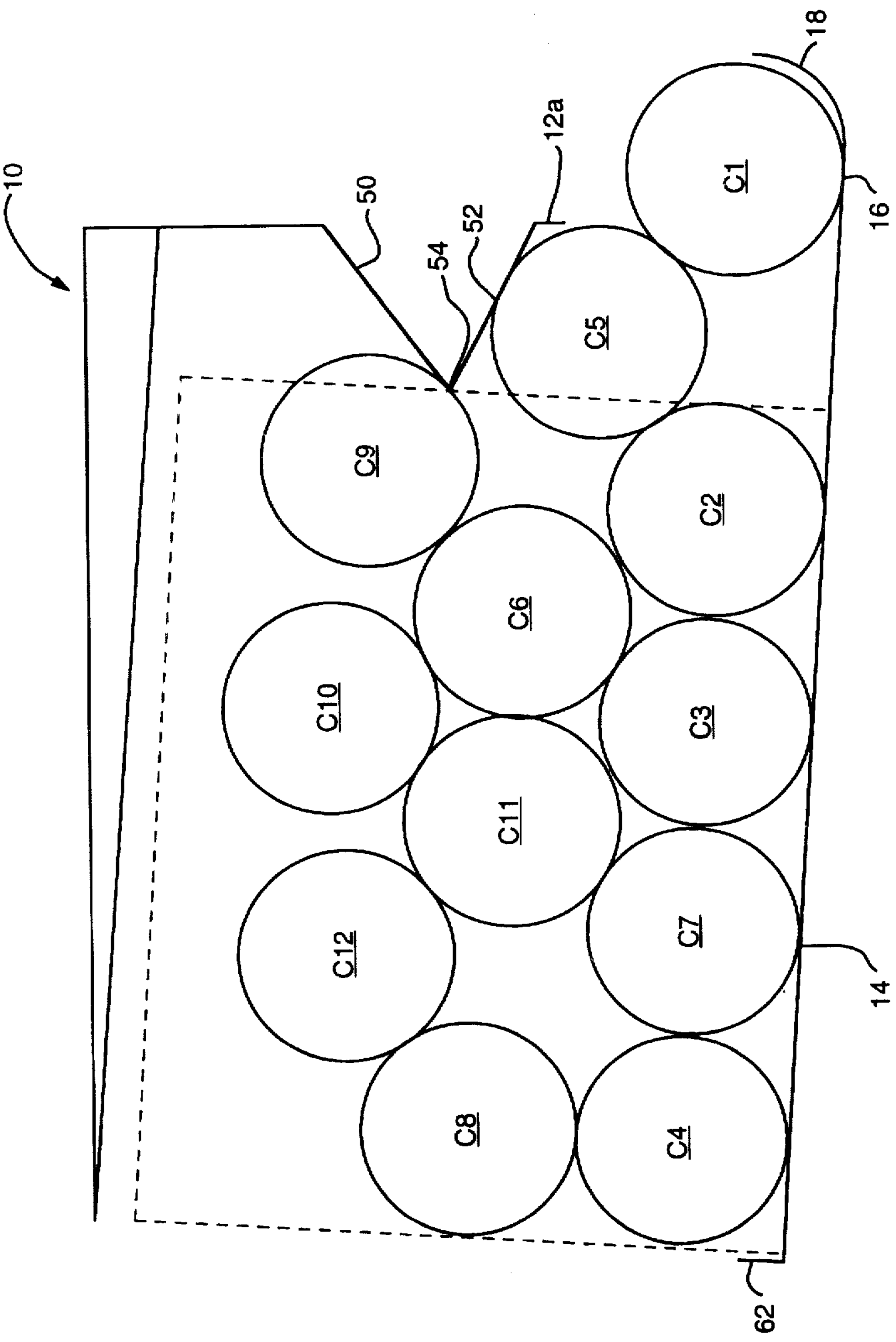
FIG. 6B is a view similar to that of FIG. 6A but with the dispenser on a horizontal surface ready for use in dispensing the cans held therein.

The manner in which dispenser 10 is used with a 12-pack of cylindrical beverage cans is schematically depicted in FIGS. 6A and 6B. First, beverage can package 100 is stood up on one end 102 on a flat surface such as a table. The ends of the twelve cylindrical cans are labelled C1–C12 for reference purposes. The other end 101 of package 100 is then opened wide by folding back the four flaps (not shown) that close end 101. Rear opening 91 of dispenser 10 is then placed over opened package end 101, and dispenser 10 is slid down along package 100 until dispenser 10 rests on the table. At this point, rear tabs 62 and 63 would not yet be engaged underneath package end 102 as shown in FIG. 6A. Rather, as dispenser 10 was then tipped forward in the direction of arrow A (so that bottom 14 moved down onto the horizontal table top), the user would push package 100 in towards vertex 54 so that package 100 seated on bottom 14, with end 102 resting against the inside surface of tabs 62 and 63.

As dispenser 10 is rotated in this fashion, cans C1 through C12 reposition within dispenser 10 and end up approximately as shown in FIG. 6B. The distance between the inside surfaces of tabs 62 and 63 and front 18 of dispensing tray 16 is approximately equal to 5½ to 5⅔ can diameters. Thus, when dispenser 10 is turned to the horizontal position shown in FIG. 6B, can C1 rolls forward into the dispensing tray and rests against front end 18. This movement causes can C5 to begin to move down and forward. However, vertex 54 is positioned very close to can C5 at or above its center line so that as can C5 moves forward, it hits vertex 54. Vertex 54 thus prevents can C5 from moving any farther directly forward. Can C5 thus must move downward as it moves farther forward, so that it ends up resting between cans C1 and C2 and against surface 52. Surface 52 prevents can C5 from moving up; if can C5 were to move up, can C2 would roll closer to can C1, which could cause can C5 to wedge between cans C1 and C9 across opening 20, and thus block the opening. At the same time, cans C2 and C3 roll forward to the positions formerly occupied by cans C1 and C2, respectively, in the undisturbed package as shown in FIG. 6A. This causes can C6 to rest between cans C2 and C3. This motion also causes can C7 to move downward in front of can C4, which also causes cans C10 through C12 to reposition approximately as shown.

A common problem with can dispensers that include only a front face and a lower can dispensing opening, without the object-repositioning structure of the invention, (for example Markel, U.S. Pat. No. 5,390,821) is that cans C9, C6 and C3 can align and wedge across the dispenser, thereby blocking opening 20. Surface 50 helps to prevent this wedging action by taking some of the weight of can C9 off of can C6. Also, vertex 54 is positioned in such a manner that can C9 is not directly lined up with cans C3 and C6, so that such wedging does not occur. Additionally, vertex 54 prevents can C9 from moving directly down when can C1 is removed which allows cans C6 and C9 to reposition and not block opening 20.

When can C1 is dispensed from package 10 by removing it from tray 16, can C5 moves down and forward into the former location of can C1. Generally, the third can dispensed is can C2, followed by can C6. The other cans follow. Virtually every time the dispenser is used, cans C4, C8 and C12 are the last three cans dispensed.

The key to the operation of dispenser 10 is the gravity-fed dispensing of the first three cans. Once three cans are removed, the remaining cans occupy only two rows, at which point it is extremely unlikely that the cans will jam opening 20. Therefore, the initial position of cans C1, C5, C2, C3, C6 and C9 as described above, are believed to be the key initial can positions accomplished by the dispenser of this invention, which facilitate the problem-free dispensing accomplished by this invention.

The dispenser of this invention is preferably molded from a plastic material. Depending on the product requirements and intended uses, the particular construction of the invention may vary somewhat from the preferred embodiment shown and described. For example, for a dispenser that is designed to allow multiple identical dispensers to be stacked one on another, the dispenser needs to have sufficient strength (at perhaps slightly elevated storage temperatures) to withstand the weight of one or more beverage packages, and also, preferably, the nesting feature described. If this function is not needed in the product, the dispenser could be accomplished without a top, and perhaps with shorter sides, or no sides at all, since the beverage package already has sides. Ultimately, it is necessary only to accomplish the object-dispensing opening, with the object repositioning structure properly placed, and some means of holding the dispenser over the opened end of the package, in order to accomplish dispensing of the objects from the package as described herein.

Most basically, the dispenser of this invention comprises a front face defining an object-dispensing opening proximate its lower end, with an object-repositioning structure positioned inward of that front face and positioned to contact the front object in the second row of objects at or above its center line to provide the dispensing action discussed above. There is preferably a dispensing tray, with an object stop that prevents the objects from freely rolling out of the dispenser.

Figure 7A:
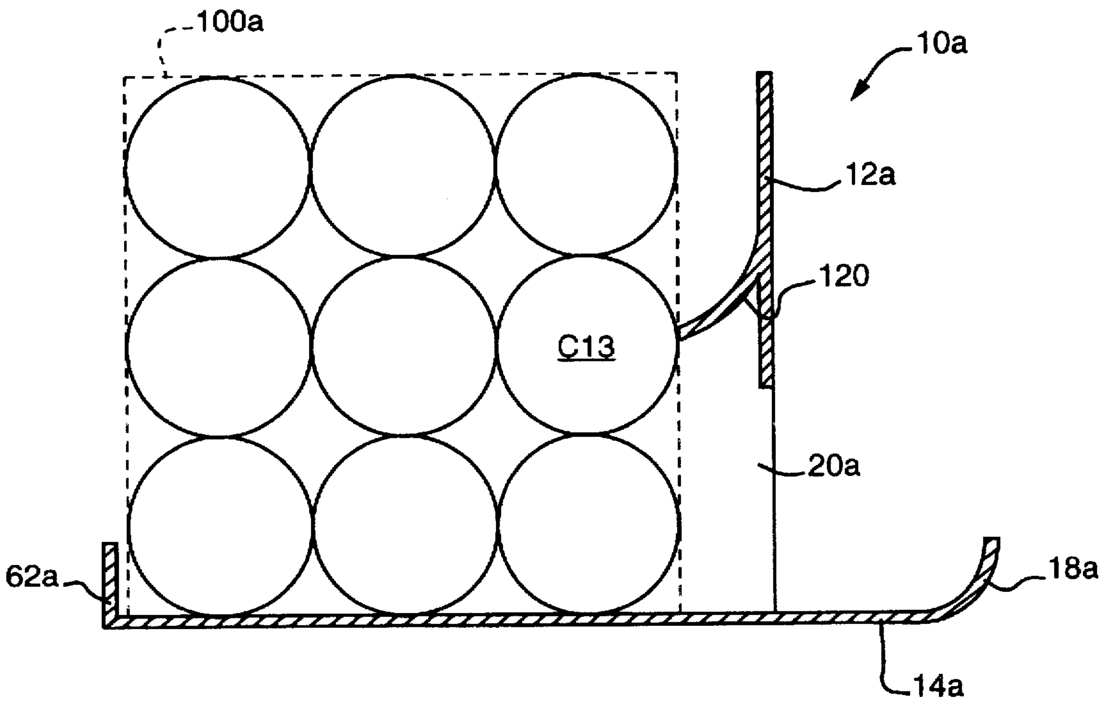
Figs. 7A and 7B are schematic cross-sectional depictions of alternative means of accomplishing this invention.

The object-repositioning means of the dispenser can take virtually any shape. Two additional possible shapes of the virtually unlimited alternatives are depicted schematically in FIGS. 7A and 7B. FIG. 7A depicts schematically a more scaled-down version of the dispenser of this invention, having no sides or back. Dispenser **10*a* includes front face 12*a* that defines opening 20*a* at its lower end and is connected to bottom 14*a* that may or may not be sloped. Exit lip 18*a* prevents the cans from freely rolling out of dispenser 10*a*. Bottom 14*a* supports beverage can package 100*a*. Rear tabs 62*a* holds package 100*a* in relation to dispenser 10*a*. Object-repositioning means 120** in this example comprises projecting curved tab that ends at a location such that it contacts can C13 at or above its center line.

Figure 7B:
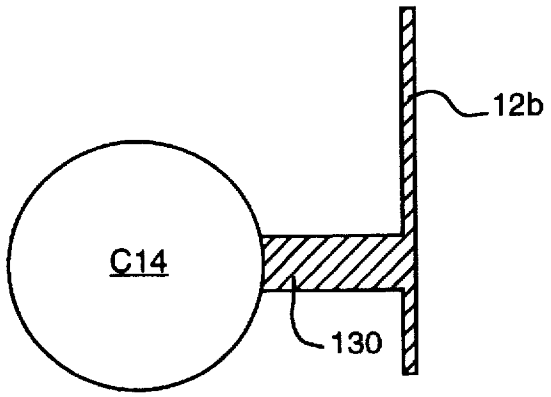

Another alternative object-repositioning means 130 is shown in FIG. 7B. Structure 130 is a block extending inward from front face **12*b***, and ends in the same position in relation to the front can in the second row of cans (can C14), as in the other embodiments.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A dispenser for dispensing cylindrical objects of uniform diameter from a package having a length, and holding at least a first bottom row, and a second next row of the objects, with at least two objects in each row, comprising:

a front face having an upper and lower end, and an inside and an outside, said front face defining an object-dispensing opening proximate the lower end thereof, said opening adapted to allow a single object to pass at a time therethrough to dispense an article from the package;

a dispensing tray at the bottom of said opening and projecting outward of said front face, to receive and hold an object dispensed from the package through said opening; and an object-repositioning structure protrudes inward from said inside of said front face and positioned to contact the object closest to said front face in the second row of objects at or above its center line when said dispenser is placed over an open end of the package and said dispenser is placed substantially horizontally in a dispensing position, said object repositioning structure inhibiting the object closest to said front face in the second row of objects from moving substantially directly forward, and guiding it downward, to cause it to freely dispense from the package through said object-dispensing opening.

2. The dispenser of claim 1 in which said object-repositioning structure includes a downwardly-sloped surface depending from the inside of said front face.

3. The dispenser of claim 2 in which said object-repositioning structure further includes an upwardly-sloped surface meeting said downwardly-sloped surface to form an object-contacting vertex.

4. The dispenser of claim 2 in which said downwardly-sloped surface forms an angle with a horizontal plane of approximately 40°.

5. The dispenser of claim 3 in which said upwardly-sloped surface forms an angle with the horizontal of approximately 20°.

6. The dispenser of claim 3 in which said downwardly-sloped surface and said upwardly-sloped surface meet at an acute angle.

7. The dispenser of claim 6 in which said acute angle is-approximately 60°.

8. The dispenser of claim 1 in which said front face is essentially vertical.

9. The dispenser of claim 1 further including a package holding means for holding the package in relation to said front face.

10. The dispenser of claim 9 further including a bottom portion connected to said dispensing tray, said bottom portion adapted to support the package thereon.

11. The dispenser of claim 10 in which said package holding means includes a tab portion extending up from said bottom portion.

12. The dispenser of claim 11 in which said tab portion is spaced from said object-repositioning structure a distance approximately the same as the length of the package, to hold an open end of the package in place proximate said object-repositioning structure.

13. The dispenser of claim 10 in which said bottom portion is sloped down toward said dispensing tray to urge the objects toward said object-dispensing opening.

14. The dispenser of claim 13 further including a top portion defining an inside top to said dispenser that approximately parallels said bottom portion.

15. A dispenser for dispensing beverage cans from a package having a length, and holding at least three rows of at least four cans each the rows including a first bottom row and a second next row, in which an end of the package can be opened, comprising:

a front face having an upper and lower end, and an inside and an outside, said front face defining a can-dispensing opening proximate the lower end thereof, said opening adapted to allow a single can to pass a time therethrough to dispense a can from the package;

a dispensing tray extending outward from the lower end of said front face, and having a bottom and end to create a receptacle from which a single dispensed can may be grasped and removed from said tray;

a wedge projecting inward from said inside of said front face and defining a can-repositioning acutely-angled vertex edge positioned to contact the can closest to said front face in the second row of cans at or above its center line when said dispenser is placed over an open end of the package and said dispenser is placed substantially horizontally in a dispensing position, said object repositioning structure inhibiting the can closest to said front face in the second row of cans from moving substantially directly forward, and guiding it downward to cause it to freely dispense from the package through said can-dispensing opening;

a bottom portion having a front and a rear connected to said dispensing tray and sloped gently downward from its rear toward said dispensing tray to hold the package at a slight angle so that the cans are urged to roll toward said can-dispensing opening; and a rear package retaining portion extending up at the rear of said bottom portion, and spaced from said vertex a distance approximately the same as the length of the package, to hold the open end of the package in place proximate the vertex.

16. A dispenser for dispensing cans from a package holding at least three rows of at least four cans each, the rows including a first bottom row and a second next row, in which an end of the package can be opened, comprising:

a front face having an upper and a lower end, an inside and an outside said front face defining a can-dispensing opening proximate to the lower end thereof, said opening adapted to allow a single can to pass therethrough at a time to dispense a can from the package; and a can-repositioning means projecting inward from said inside of said front face and defining a can-repositioning structure positioned to contact the can closest to said front face in the second row of cans at or above its center line when said dispenser is placed over an open end of the package and said dispenser is placed substantially horizontally in a dispensing position, said object repositioning structure inhibiting the can closest to said front face in the second row of cans from moving substantially directly forward, and guiding it downward, to cause it to freely dispense from the package through said can dispensing opening.

17. The dispenser of claim 16 in which said can-repositioning means includes a generally wedge-shaped structure.

18. The dispenser of claim 16 in which said can-repositioning means includes a structure projecting inward from said front face toward the cans.

* * * * *